United States Patent [19]

Kato et al.

[11] 4,089,918

[45] May 16, 1978

[54] PROCESS FOR THE CONTINUOUS CASTING OF LIQUID POLYMERIZABLE COMPOSITIONS

[75] Inventors: Yasuyuki Kato; Masahiko Moritani; Seiichi Suzuki, all of Niihama, Japan

[73] Assignee: Sumitomo Chemical Company, Limited, Osaka, Japan

[21] Appl. No.: 643,631

[22] Filed: Dec. 23, 1975

[30] Foreign Application Priority Data

Dec. 25, 1974 Japan .................................... 49-3700

[51] Int. Cl.$^2$ ............................................. B29D 7/14
[52] U.S. Cl. .................................. 264/40.7; 264/166; 264/216; 264/236
[58] Field of Search ..................... 266/216, 166, 40.7; 264/236

[56] References Cited

U.S. PATENT DOCUMENTS

| | | | |
|---|---|---|---|
| 3,376,371 | 4/1968 | Opel et al. | 264/216 |
| 3,383,448 | 5/1968 | Bader et al. | 264/166 |
| 3,600,490 | 8/1971 | Billingsley et al. | 264/216 |
| 3,852,387 | 12/1974 | Bortnick et al. | 264/216 |
| 3,872,197 | 3/1975 | Kato et al. | 264/216 |
| 3,894,826 | 7/1975 | Kato et al. | 264/216 |
| 3,978,178 | 8/1976 | Oshima et al. | 264/166 |

*Primary Examiner*—Jay H. Woo
*Attorney, Agent, or Firm*—Birch, Stewart, Kolasch & Birch

[57] ABSTRACT

A process and apparatus for the continuous casting of a liquid polymerizable composition comprising feeding the liquid polymerizable composition together with a pair of continuous gaskets into a spacing between a pair of moving endless belts arranged such that the lower run of the upper belt is disposed above the upper run of the lower belt and said runs are driven concurrently in the same direction at substantially the same speed, said gaskets being fed such that they circumscribe both side end portions of the spacing to form a cavity, while moving together with the moving belts and keeping in contact with the opposing surfaces of the belts. Passing the composition through a portion of the path of the belts to partially polymerize said composition to such a viscosity that a common logarithm of its viscosity in terms of poise at the temperature of polymerization is within the range of 2 to 5, then passing a portion of the path thereof arranged so as to be curved at least once to bring its degree of polymerization within the range of 40 to 60 weight per cent, and thereafter passing the composition through a straight portion of the path for complete polymerization, said path for polymerization being arranged such the lower and upper runs of the respective belts are brought closer together to follow shrinkage of the composition upon polymerization. Finally the resultant polymerized plate product with a good preciseness in thickness in the widthwise direction and with favorable surface qualities is removed, from the discharge end of the belts.

8 Claims, 2 Drawing Figures

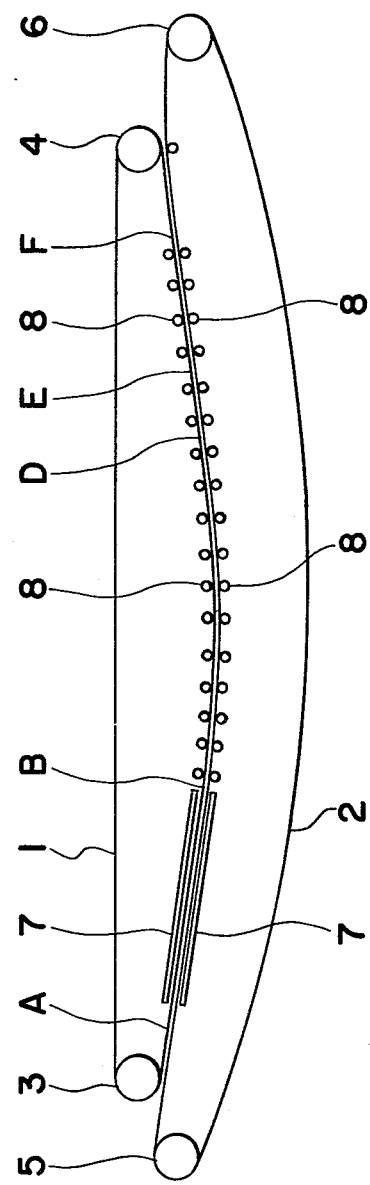
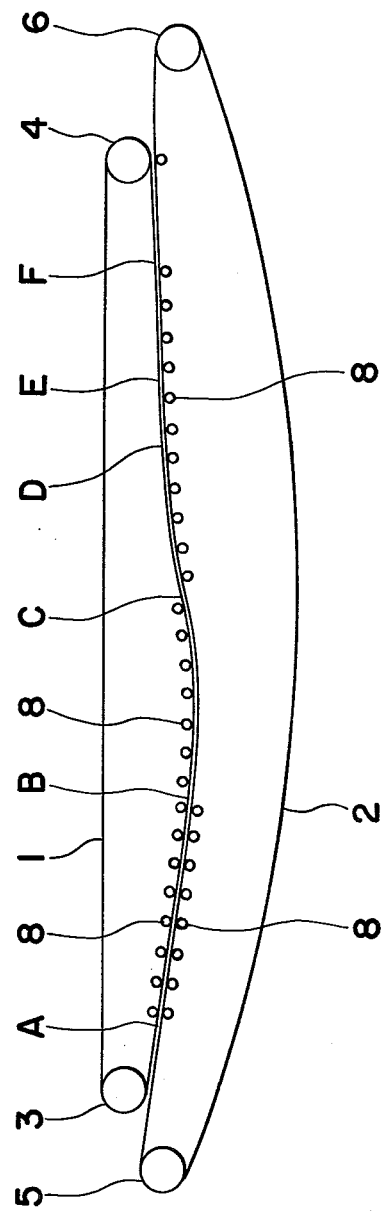

PROCESS FOR THE CONTINUOUS CASTING OF LIQUID POLYMERIZABLE COMPOSITIONS

BACKGROUND AND SUMMARY OF THE INVENTION

The present invention relates to a process and apparatus for the continuous casting of a liquid polymerizable composition. In particular the present invention relates to a process in which the liquid polymerizable composition is continuously fed into a spacing defined between a pair of moving endless belts and formed into plates.

Cell casting is in general known as a process for the preparation of plates of polymers from polymerizable monomers by the application of heat or light. The cell casting has been employed, for example, for the preparation from methyl methacrylate of plates of methacrylic resins having desirable properties including transparency, surface gloss and weatherability. The cell casting is a method in which a liquid monomer such as, for example, methyl methacrylate or a syrup containing in part its polymerized compounds is cast in a cell into which two sheets of reinforced glasses are assembled with their outer peripheries sealed with flexible gaskets. The cell casting process involves polymerization of said liquid monomers fed into such a cell that is immersed in a hot water bath or in a hot air oven and the stripping of the resulting plates from the cell by separating the assembled cell. Accordingly, the applicability of conventional cell castings may be largely restricted by the size of the glasses used. This method involves a series of staged operations such as the cell assembly, the feeding of liquid monomers and the separation of the assembly, so that it requires a great deal of manual work. Consequently, this method raises the cost of product, and there has been a growing demand for continuous casting process.

Some continuous casting processes are known, for example, U.S. Pat. Nos. 2,500,728, 3,371,383, and 3,376,371. Japanese Patent Publication No. 41,602/1971, and Canadian Patent No. 895,406. Each discloses a process for the preparation of a plate of a polymeric material which comprises filling with a polymerizable material a spacing defined between a pair of endless belts, the first belt being disposed above the second belt, and completing polymerization during the movement of the belts. These processes, however, result in a non-uniformity of the thickness of the resulting plates. Particularly, the main difficulty involved in conventional continuous casting processes is the loss of control over the thickness of the final plate product in a widthwise direction. For example, Canadian Patent No. 895,406 discloses a process in which one of the two belts is so curved that the pressure applied by the other belt is made uniform, thus preventing the warping, waving or rippling of the belts. However, the process disclosed therein is not satisfactory in that control of the precise thickness of the final product is not achieved and the surface quality of the final product, particularly in the widthwise direction, is impaired.

It is therefore the primary object of the present invention to provide a process for the continuous casting of a liquid polymerizable composition which can overcome or reduce to a considerable extent the disadvantages of prior art continuous casting processes.

Another object of the present invention is to provide a process for continuously casting a liquid polymerizable composition which comprises feeding the liquid polymerizable composition into a spacing defined between a pair of moving endless belt conveyors, polymerizing it partially to a viscosity in a specified range, passing the partially polymerized composition through a path which is arranged so as to curve at least once, until a degree of polymerization of the resulting partially polymerized composition reaches a predetermined value, and then passing it through a path which is arranged in a straight direction for completion of the polymerization of the partially polymerized composition.

Another aspect of the present invention is an apparatus for continuously casting a liquid polymerizable composition by the process according to the present invention.

Other objects, features and advantages of the present invention will become apparent in the following description of the specification and from the accompanying drawings and from the appended claims, in which:

FIGS. 1 and 2 are each a schematic diagram of the apparatus of the present invention.

According to the present invention, there is provided a process for continuously casting a liquid polymerizable composition which comprises feeding continuously the liquid polymerizable composition into a cavity confined by a spacing defined between a pair of moving endless belts and between a pair of continuous peripheral gaskets, said moving endless belts being arranged such that the lower run of the upper belt is disposed above the upper run of the lower belt and the respective runs are allowed to move concurrently in the same direction at substantially the same speed, and said gaskets being fed in the side edges of the spacing such that they can circumscribe both edges of the spacing while allowing the liquid composition to travel through a path in a polymerization region in which the composition is partially polymerized to such an extent that a common logarithm of the viscosity of the composition in terms of poise at the temperature of polymerization is within a range from 2 to 5. The resulting partially polymerized composition is passed through a path which is arranged so as to curve at least once at a suitable radius of curvature until the composition is further polymerized partially to provide a composition having a degree of polymerization within a range of about 40 to 60 weight percent based on the total weight of the composition. The polymerization of the partially polymerized composition is completed by passing through a path which is arranged in a straight direction, and removing the plate of the polymerized composition from the belts opposite to the feed side of the moving belts. The spacing defined between the moving belts is arranged such that the lower run of the upper belt and the upper run of the lower belt are brought closer together, whereby contact between the composition and both belts is maintained during the polymerization in response to the volume variation of said composition. Using this process, plates of polymeric material are prepared from a liquid polymerizable composition, which have a uniform thickness, particularly in the widthwise direction, and a good surface quality is obtained.

In another aspect the present invention provides apparatus for the continuous casting of a liquid polymerizable composition which comprises a pair of endless belts which are arranged and constructed such that the lower run of the upper belt is positioned above the upper run of the lower belt to provide a space sefined between the belts at a desired predetermined distance, said runs being arranged so that the path between the runs is provided with a region where it is curved at least once at a given radius of curvature and thereafter with a region where it is maintained straight. A pair of continuous gaskets are arranged such that they circumscribe the spacing defined between the belts at both edges to from a cavity and which can move together with the movement of the belts while remaining in contact therewith to form a pair of seals to confine the liquid polymerizable composition in the cavity, means for adjusting the cavity between the runs to a desired predetermined thickness, means for adjusting the cavity in response to the variation of the volume of the composition which takes place with the advancement of the polymerization, and means for driving the belts in the same direction at substantially the same speed.

The material for the endless belts used for the apparatus according to the present invention may be a metal such as steel or stainless steel. A plastic film may be employed together with a metal belt by superimposing the film thereon. In general, the thickness of the metal belt is from about 0.1 to 3 mm. and preferably from 0.5 to 2 mm.

The liquid polymerizable composition to be used in the present invention comprises one or more unsaturated monomers which are liquid under normal pressure. The composition may be partially polymerized, prior to the introduction into the moving belts, to such an extent that it may be fed into a spacing between the two conveyor belts without any undesirable effect. If the composition is used as a syrup in which the polymerized compositions are dissolved, it is preferred to use a syrup having a viscosity in the range in which the fluidity thereof is not impaired by feeding it between the moving belts. The viscosity of the syrup may be generally up to about 30 poises.

The unsaturated monomers which may be used as the liquid polymerizable composition in the present invention include, for example, methacrylates, styrene and its derivatives having at least one halogen atom and/or alkyl group substituents, particularly lower alkyl groups having from 1 to 6 carbon atoms or a mixture thereof with a monomer containing at least one unsaturation which is different from and copolymerizable with the said unsaturated monomers, such as acrylates, acrylonitrile or derivatives thereof or a polyfunctionally unsaturated monomer having at least two saturations. The monomers of the type different from and copolymerizable with the methacrylate, styrene or derivatives thereof may be employed preferably in an amount up to about 20 percent based on the total weight of the liquid polymerizable composition. Examples of the poly-functionally unsaturated monomers are glycol dimethyacrylate, diallyl methcarylate, diallyl phthalate, diethylene glycol and bisallyl carbonate. The process of the present invention is particularly suited for the polymerization of methyl methacrylate. The liquid polymerizable composition of the present invention may also contain conventional additives such as colouring agents, ultraviolet ray absorbers, thermal stabilizers, plasticizers, stripping agents and/or fillers.

The liquid polymerizable composition may be introduced into a cavity defined between the moving belts in conventional manner. For this purpose, the apparatus of the present invention may be provided with a device for feeding the composition in an appropriate amount for each time successively into the moving belts. Moreover, the apparatus may be equipped with a device for preventing a drop of the lower run of the upper belt toward the upper run of the lower belt by the aid of the liquid pressure.

The polymerization of the liquid polymerizable composition generally proceeds in accordance with radical polymerization reactions known per se in the art. The temperature for the radical polymerization reaction is generally in the range of from 50° to 150° C., although it is not limited to this range. Examples of polymerization initiators capable of forming radicals in the above-mentioned temperature range are azo compounds such as azobisisobutyronitrile, azobisdimethylvaleronitrile, or azobiscyclohexanitrile, and peroxides such as benzoyl peroxide, lauroyl peroxide, acetyl peroxide, capryl peroxide, 2,4-dichlorobenzoyl peroxide, isopropylperoxydicarbonate, isobutyl peroxide, acetyl cyclohexylsulfonly peroxide or bis(4-tert.-butylcyclohexyl)-peroxydicarbonate. The polymerization initiator may be used alone or in combination. The amount of the polymerization initiator is generally in the range of 0.005 to 5 percent by weight based on the weight of the liquid polymerizable composition.

In a region of the path starting from point A (so referred to herein) through which the liquid polymerizable composition is caused to partially polymerize, heat is applied to the composition outside the belts. The heating may be effected in various ways such as spraying hot water on the external surface of the moving belts; passing the moving belts through a hot water bath; steaming the moving belts; or exposing the moving belts to infrared radiation. The temperature of this polymerization region may be kept at a constant level throughout its whole region where polymerization takes place, or may be changed continuously or stepwisely in an appropriate manner. The polymerization temperature may be chosen depending upon the type and amount of polymerization initiator.

The liquid polymerizable composition of the present invention which was fed into a cavity between the belts and between the peripheral gaskets is first passed through a zone where partial polymerization is caused to take place by the application of heat, to such an extent that a common logarithm of the viscosity of the composition in terms of poise at the temperature of polymerization is within the range from 2 to 5, preferably from 2.7 to 4. If the viscosity of the composition is such that the common logarithm thereof is below the lower limit at the point where the first curve in the path begins, the composition tends to leak from the cavity defined between the moving belts during the course of polymerization, thereby making it difficult to obtain a satisfactory final product or providing a non-uniform thickness of the polymer plate. A viscosity of the composition above the upper limit expressed as the common logarithm thereof is not desirable, too, because the non-uniformity in the thickness of the final product results and, particularly, preciseness of the thickness of the plate lacks in a widthwise direction.

The path of the moving belts from a point where the composition is fed into the spacing defined between the belts to point B may be straignt in a horizontal direction or in such a manner as inclined at an appropriate angle to the horizontal or may be curved to follow a natural curvature that may be defined by the moving belts when arranged so as to be inclined at a suitable angle to the horizontal.

The thermal polymerization zone up to point B is provided with a mechanism for adjusting and maintaining the space between the belts in a desired thickness and at the same time preventing the leakage of the composition out of the space between the belts by arranging a pair of the peripheral gaskets so as to bring the opposing surfaces of the lower and upper runs of the respective belts at their opposing edges in contact therewith. This mechanism may be designed so as to be capable of compensating for any variation in volume of the composition during polymerization. Such mechanism may also be empolyed in combination with a mechanism for bringing the surfaces of the belts closer together to an extent sufficient to compensate for any shrinkage of the composition during polymerization. In this thermal polymerization zone is provided a rotatable support member such as a roller or a non-rotatable support member having a smooth roll surface for the purpose of supporting the moving belts and bringing the surfaces of the belts closer together to follow the volume change of the composition.

This partially polymerized composition is then led to a zone where a pair of the belts are curved at least once in such a manner as having an appropriate radius of curvature as will be defined hereinbelow. Point B is also the point where the belts begin to curve. The number of the curves of the belts is not limited hereto, and the belts may be curved a plurality of times. The adjacent curves are connected with each other through an inflection point, that is, a point where two curves meet (hereinafter referred to in general as point C). Thus the belts having two curves possess one inflection point. It is preferred to provide the path of the belts with two curves through one inflection point. The belts may also have a substantially straight portion between adjacent curves, the straight portion between the adjoining curves may be arranged so that it has a common tangent to the two curves at a common inflection point. However, the straight portion should not be too long because it may impair the effect to be achieved by providing the belts with the curves. The belts are also designed so that they travel through a straight path after a point where a series of curves ends (hereinafter referred to as point D).

The polymerization of the partially polymerized composition further proceeds during the course of the curved path by applying heat thereto in the same manner as described hereinabove. In this region is preferably provided a rotatable support member such as a roller for the purpose of supporting the moving belts, whereby the surfaces of the moving belts are allowed to be brought closer together in response to the volume change of the composition during polymerization. Where a portion of the path curves concavely, the belts may be arranged and constructed such that the lower run of the upper belt is supported by means of a rotatable support member such as rollers and the upper run of the lower belt is not supported by such a support member and instead by its own tension that can push the upper run thereof concavely in a direction against the lower run of the upper belt, whereby the belts may preferably allow to follow the volume variations of the composition during the passage through the curved path, and vice versa. It is preferred that such a mechanism for adjusting and maintaining the space between the belts in a desired given thickness is also provided in this zone.

Where a moving belt made from the said metal, for example stainless steel, is employed, the radius of the curves which begin at point B may be represented by the following equation:
$R = K \times S \times T$ where R is the radius of curvature (in meters); S is an intial tension strength applied to the belt (in kilograms per square millimeter); T is a thickness of the belt (in millimeters); and K is a constant. The constant K is a value that varies with the initial tension strength S and the thickness T of the belt and may range preferably from 2 to 100. Where the belts are curved twice, the radius of the first curve starting from point B can be calculated by the constant K being within the range of 2 to 100, and that of the second curve may not be limited to the value in which the upper limit of the constant K is not particularly limited to said value. Where the constant K is below the lower limit, the lower and upper runs of the respective upper and lower belts, which are arranged to move in the same direction at substantially the same speed, tend to slide slightly out of position, thus causing a relative movement between the runs so that the surfaces of the plates of polymeric material are impaired. This is also a disadvantage because of the stress being put on the moving belts. The lower limit of the curvature radius may be chosen by a force given by the pressure of the belts, which can prevent the countercurrent flow of the liquid composition disposed between the belts at point B. That is, the pressure given by the belts should be determined in such a manner that it becomes smaller than the liquid pressure of the composition at point B. Where the curvature radius is fairly greater than a value when calculated as K being the said upper limit, this may reduce the effect expected to be achieved by providing the belts with curves in a specified manner, and the thickness of the plate does not become uniform particularly in a widthwise direction. Thus, a plate of polymer having a uniform thickness, particularly in a widthwise direction precisely satisfying a desired value can be obtained where the belts are to be curved at least once from point B and the constant K is within the above range.

The liquid polymerizable composition is allowed to polymerize partially to a degree of polymerization within the range of about 40 to 60 percent by weight based on the weight of the composition, during the passage through the curved path of the belts. The partially polymerized composition is then led to a zone in which the belts are disposed in a straight direction. The point at which this zone starts will be referred to as point D in the following specification. Since the composition at point D in a jelly-like or agar-like form, its viscosity is not to be measured. Since the composition at this point undergoes a maximum decrease in its volume due to rapid variations in its degree of polymerization, it is characterized physically, at point D, by its degree of polymerization. Where the degree of polymerization at point D is less than the said lower limit, it is not desired because the resulting plate of the composition tends to cause a non-uniformity in thickness, particularly in a widthwise direction. Where the degree of polymerization at point D is greater than the upper limit, the resulting plate will exhibit an undesirable surface quality and, particularly, tends to be caused a wavy pattern in a widthwise direction on its surface. The plate of polymeric material with a uniform thickness, particularly in a widthwise direction, and a good surface quality, where the degree of polymerization at point D is defined within the given range.

The partially polymerized composition having a degree of polymerization within said range is then led to the path which is arranged and constructed so as to be in a straight line from point D to a point where the straight portion ends (hereinafter referred to as point F). Point F is also the point of the end portion of a mechanism for adjusting the space between the belts in response to the volume change of the composition and the polymer plate formed therefrom.

The straight portion is provided with a zone where the polymerization is carried out by the application of heat and thereafter with a zone where the composition is treated by the application of heat. The end point at which the heat polymerization zone terminates will be referred to hereinafter as point E. The composition is further polymerized during the passage through the region between points D and F, increasing its degree of polymerization to a point of complete polymerization.

The heat polymerization zone provided after point D is arranged such that the composition is caused to amount to a degree of polymerization ranging from about 80 to 95 weight percent. This zone comprises generally spraying or showering a hot water against the exterior surfaces of the moving belts; steaming the exterior surfaces of the moving belts; or running the moving belts in a hot water bath.

The zone where the composition is treated by heat is arranged so as to allow the composition to bring about complete polymerization. This zone generally comprises applying infrared radiation or the flow of hot air current to the exterior surfaces of the moving belts. This heat treatment zone may be preferably arranged so as to be in a position above the position of the heat polymerization zone because the water used in the heat polymerization zone accompanies the moving belts to the heat treatment zone and this makes it difficult to maintain the heat treatment zone at a desired temperature range. Thus, it is preferred to arrange the path between points D and F so as to drive the belts in a straight direction inclined at an appropriate angle to the horizontal, positioning the heat polymerization zone below the heat treatment zone. Where the composition does not reach the said lower limit in its degree of polymerization at point E, it is also possible to complete the polymerization in the heat treatment zone, although this is not desired because the resulting plate of the composition may be caused to contain bubbles therein.

The straight portion is further provided with a mechanism for bringing the surfaces of the moving belts close together while keeping them in contact with the surfaces of the polymer plate to compensate for any shrinkage during polymerization. For this purpose, a rotatable supporting member such as rollers or a non-rotatable supporting member having a smooth surface may be employed. These supporting members also serve as supporting the moving belts so as to maintain the space between the belts at a desired thickness. These supporting members may be arranged such that they are designed so as to support the upper run of the lower belt alone, while the lower run of the upper belt is designed so as to allow the concurrent movement by its own weight together with the polymer plate that is driven in association with the movement of the lower belt.

The straight portion of the path of the moving belts from point E to point F may be provided with a zone for cooling the polymer plate at any suitable position after the heat treatment zone. The cooling zone may be also positioned after point F. The cooling may be accomplished in any conventional manner, for example, by blowing cold air to the moving belts or by leaving it to stand in air after discharged from the space between the moving belts.

Referring now to the drawings,

FIG. 1 illustrates a schematical side view of the continuous casting apparatus of the present invention wherein the path defined by the moving belts is curved once and supporting members are provided at both sides of the belts; and FIG. 2 illustrates a schematical side view of the apparatus of the present invention wherein the belts are curved twice and supporting members are provided in part.

FIGS. 1 and 2 are examples of the continuous casting apparatus of the present invention in which the upper run of the lower belt is longer than the lower run of the upper belt. These figures indicate each a relative location of points A through F. As shown herein, there are each the moving belts in which point A is positioned above point B and the path between them is disposed in a straight direction. It is further inidcated therein that the path from point D is inclined upwardly to the horizontal so as to position point D below points E and F.

As further shown in FIGS. 1 and 2, endless belt 1 is provided with tension by means of a set of pulleys 3 and 4 and endless belt 2 is by means of another set of pulleys 5 and 6. The pulleys 4 and 6 are designed so as to drive at the same peripheral speed or either of them is designed to drive and the other is arranged so as to be caused to drive by the aid of the plate of polymeric material and/or the gaskets between the moving belts. The liquid polymerizable composition is fed continuously into the moving belts at its inlet together with a pair of the continuous gaskets and the resulting plate is discharged from the outlet between the moving belts.

Referring specifically to FIG. 1, the lower and upper runs of the respective belts in the path between points A and B are held and maintained by means of a non-rotatable support 7 having a frame structure, so as to provide a spacing defined between them at a desired thickness. The path between points B and F is provided with two sets of rollers, indicated generally by number 8, so that the moving belts are held under tension and in a manner capable of following the change in volume of the composition during the course of polymerization.

Referring now to FIG. 2, the zone between points A and B is provided with two sets of rollers 8 in order to hold the moving belts under tension having a spacing defined between them at a desired thickness. In the path between points B and F, a set of rollers are arranged and constructed at the one side only so as to cause the upper belt to curve in a manner satisfying the requirement for the radius of curvature as specified above. Specifically, the path between points B and C is provided with a set of rollers 8 in such a manner that the rollers allow the lower run of the upper belt to follow a concavely arcuate curvature meeting the requirement for the radius of curvature as defined hereinabove and the upper run of the lower belt is held under tension by means of the pulleys 5 and 6, which is designed so as to apply pressure to the upper belt in an upward direction and to drive concurrently with the upper belt by the aid of the pressure given by the belts held under tension by the pulleys 5 and 6. This makes the moving belts capable of following in response to the volume change of the composition during the course of polymerization. In the path from point C to point D, a set of rollers are provided only at the side of the upper run of the lower belt in a manner converse to the previous path but functioning in substantially the same manner as in the path from point B to point C. Thus, the rollers 8 are arranged in such a manner that, where a portion of the path is in a convexly arcuate curved manner, a set of the rollers are positioned only on one side of the lower belt to thereby forcibly guide a corresponding portion thereof to extend in a convexly curved manner, while a corresponding portion of the upper belt is adapted to follow the curve of that portion of the upper run of the lower belt defined by said set of the rollers, by the effects of tension exerted to the upper belt and of the weight thereof.

FIGS. 1 and 2 show the embodiments of the apparatus according to the present invention in which the pulleys 3 and 4 are positioned on the same height. The respective position of the pulleys, however, should be construed as being not limited thereto, and it may be possible to position either of the pulleys above or below the other. In order to lower the height of a housing of the apparatus, it is desired to arrange both of the pulleys at the same height.

Although FIGS. 1 and 2 illustrate a pair of the moving belts in which the upper belt is shorter than the lower as described hereinabove, it is not limited thereto and it may be possible to arrange the belts in such a manner that the lower and upper runs of the respective belts have the same length.

It is desired that a distance between a point of the pulley at the feed inlet side and point A is as short as possible. This is true of the length of the path between point F and a point of the pulley at the discharge side and it may be possible to design point F to come just below the center of the upper pulley at the discharge side. By making these distances as short as possible, it can be possible to make the path longer and effectively available for the heat polymerization zone and the heat treatment zone. And the cooling zone may also be provided with efficiency. This is advantageous in terms of separating the plate of the composition from the moving belts with ease.

The straight portion from point F to the discharge outlet may be disposed in a horizontal manner of inclined at an appropriate angle to the horizontal. This portion may be arranged so as to have a spacing between the moving belts having a thickness thicker than the thickness of the plate of the composition.

The gasket to be used for the present invention is generally of filamentous plastic material. Examples of such materials are soft polyvinyl chloride, polyethylene, polypropylene, ethylene-vinyl acetate copolymer, natural rubber, rubbers of different type and other flexible plastic materials. Soft polyvinyl chloride is in general preferred and may preferably contain from about 80 to 170 parts by weight of a plasticizer such as dioctyl phthalate based on 100 parts by weight of the polyvinyl chloride. The cross section of the gasket may be in any any shape such as square, rectangle or circle, and the gasket in the form of a hollow pipe is generally preferred.

The following examples illustrate the present invention without, however, limiting the same thereto. In the following examples, percent is by weight.

EXAMPLE 1

An apparatus having a construction as shown in FIG. 2 was employed, in which a pair of stainless steel belts having a flat, polished surface are each 500 mm. wide and 0.6 mm. thick; a mechanism for adjusting a spacing defined between the belts to follow the volume change of a liquid polymerizable composition is provided through a heat polymerization zone and a heat treatment zone up to a cooling zone; the belts are curved twice from point B; and a region from point D to point F is maintained in a straight direction. In the path through which the lower and upper runs of the respective upper and lower belts travel, the horizontal distance is 3,500 mm. long between points A and B; 1,489 mm. long between points B and C; 751 mm. long between points C and D; and 4,260 mm. long between points D and F.

The straight portion from point A to point B is supported at both sides of the belts by rollers and inclined at an angle of three degrees to the horizontal. The portion between points B and C is curved at a radius or 14,000 mm. and arranged such that the lower run of the upper belt alone is supported by a set of rollers. The curved portion from point C to point D has a radius of 39,213 mm. and it is arranged so as to support only the upper run of the lower belt by means of a group of rollers. The straight portion between points D and F is inclined at an angle of two degrees to the horizontal and designed such that the upper run of the lower belt is supported by a group of rollers.

The portion between points A and E is a zone where the polymerization is caused to occur by the application of hot water having a temperature of 85° C. The first portion having a horizontal distance of 2,170 mm. from point E is a zone where hot air having a temperature of 120° C. was blown to the moving belts. The second portion having a horizontal distance of 1,090 mm. up to point F is a zone where a cool air is applied to the moving belts.

A syrup having a viscosity of 4 poises at 25° C. and containing a solution of 14 percent of polymethyl methacrylate and 0.08 percent of azobisisobutyronitrile in methyl methacrylate was continuously fed together with a pair of hollow, cylindrical gaskets made of soft polyvinyl chloride containing 55 percent of dioctyl phthalate from one side into a spacing between the moving belts. The upper and lower belts are held under an initial tension of 3 kilograms per square mm. and driven at a speed of 217 mm. per minute. The distance between the belts at the portion from point A to point B is arranged so as to thereby provide a plate product having a thickness of 3 mm.

The viscosity of the partially polymerized composition at point B was 1,250 poises and the degree of polymerization at point D was 58 percent.

The plate product was found to have a reduced viscosity of 3.3 dl per gram at 25° C. in a 0.1% chloroform solution and contain 0.9 percent of the methyl methacrylate residue. The thicknesses of the plate product in a widthwise direction ranged from 2.95 mm. as the minumum to 3.06 mm. as the maximum. This indicates that the resulting product has a very favorable preciseness in thickness in a widthwise direction, and the product possesses a very smooth, excellent surface quality.

COMPARATIVE EXAMPLE 1

With the same apparatus employed in Example 1, a syrup having a viscosity of 4 poises at 25° C. and containing a solution of 14 percent of polymethyl methacrylate and 0.22 percent of azobisisobutyronitrile in methyl methacrylate was caused to polymerize under the same conditions as in Example 1. In this example, the viscosity of the syrup at point B was found to be 400,000 poises and the degree of polymerization at point D was 94 percent.

The resulting polymer plate was found to have a reduced viscosity of 2.1 dl per gram at 25° C. in a 0.1% chloroform solution and contain 0.6 percent of the methyl methacrylate as the residual component.

The thicknesses of the plate product in the widthwise direction varied to a considerably irregular extent, ranging from 2.58 mm. to 3.40 mm. and the product possessed wavy patterns in a widthwise direction. This seems to be due to its high viscosity at point B and its high degree of polymerization at point D.

COMPARATIVE EXAMPLE 2

The apparatus employed in Example 1 was used here except that the path defined by the lower and upper runs of the respective belts are arranged as follows: the horizontal distance from point B to point C was 1,892 mm. long and curved at a radius of 17,000 mm.; the horizontal distance between points C and E was 1,348 mm. and curved up to point E at a radius of 56,015 mm, and the upper run of the lower belt alone was supported by a group of rollers; and the straight portion was 3,260 mm. long as the horizontal distance and arranged so as to support the upper run of the lower belt alone by means of a group of rollers, having an inclination at an angle of 2° to the horizontal.

With the syrup used in Example 1, the reaction conditions employed in Example 1 were repeated to thereby give a plate product having a thickness of 3 mm. In this example, it was found that the degree of polymerization at point E was 94 percent.

The resulting plate product was found to have a reduced viscosity of 3.4 dl per gram at 25° C. in a 0.1% chloroform solution and contain 0.8 percent of the methyl methacrylate residue. It was further found that it had thickness variations in the widthwise direction ranging from 2.93 mm. to 3.08 mm. Although this plate had a good preciseness in thickness, wavy patterns were formed on the surface of the plate in a widthwise direction. This seems to be due to a high degree of polymerization at a point where the straight portion of the path began.

COMPARATIVE EXAMPLE 3

With the apparatus of Example 1, the portion between points A and F was arranged straight and point A was positioned above point F in such a manner as having an inclination at an angle of 3° to the horizontal. The belts are supported at their both sides each by a set of rollers and divided into the respective zones in the same manner as in Example 1.

The syrup in Example 1 was caused to polymerize in the same manner as in Example 1 to give a plate having a thickness of 3 mm. This plate was found to have a reduced viscosity of 3.1 dl per gram at 25° C. in a 0.1% chloroform solution and contain 0.8 percent of the methyl methacrylate residue. Although the surface quality of the resulting product was good, e.g. having a smooth, excellent surface, its thicknesses in the widthwise direction varied irregularly, ranging from 2.55 mm. to 3.48 mm. This seems to arise due to no curvature being provided in the path through which the polymerization was effected.

EXAMPLE 2

The apparatus of Example 1 was arranged in which the straight portion between points A and B had a horizontal distance of 2,900 mm.; the curved portion between points B and C had a horizontal distance of 1,431 mm. and it was curved at a radius of 13,000 mm.; the portion from point C to point D had a horizontal distance of 809 mm. and it was curved at a radius of 25,639 mm.; and the straight portion from point D to point F had a horizontal distance of 4,860 mm. and it was included at an angle of 1.5° to the horizontal.

A syrup having a viscosity of 4 poises at 25° C. and containing a solution of 14 percent of polymethyl methacrylate and 0.5 percent of lauroyl peroxide in methyl methacrylate was fed into a spacing between the belts under the same conditions as in Example 1 except for the application of hot water having a temperature of 80° C. instead of 85° C. The viscosity of the composition at point B was found to be 352 poises and the degree of polymerization at point D was 48 percent.

The resulting plate having a thickness of 3 mm. was found to have a reduced viscosity of 2.7 dl per gram at 25° C. in a 0.1% chloroform solution and contain 0.6 percent of the methyl methacrylate residue. The thickness of the product in the widthwise direction was found to be excellent, ranging from 2.92 mm. to 3.05 mm. It was also noted that its surface was smooth and excellent, thereby giving a very favorable overall quality.

EXAMPLE 3

The apparatus employed in Example 1 was used in which the belts were curved once from point B and the portion from point D to point F was arranged straight. In this apparatus, the horizontal distance between points B and D was 1,640 mm. and it was curved at a radius of 17,736 mm. while the upper and lower belts in this curved portion are supported each by a set of rollers; the straight portion between points D and F had a horizontal distance of 4,860 mm. and it was inclined at an angle of 2.3° to the horizontal and supported at its both sides of the moving belts by a set of rollers. The other apparatus arrangement was the same as with that of Example 1. In this apparatus, the polymerization was effected by applying water having 90° C.

A syrup having a viscosity of 2 poises at 25° C. and prepared by polymerizing methyl methacrylate with 0.001 percent of azobisisobutyronitrile at 80° C. and dissolving additionally 0.08 percent of azobisisobutyronitrile in the resulting syrup was allowed to polymerize under the same conditions as in Example 1 to yield a plate having a thickness of 3 mm. The viscosity of the syrup at point B was found to be 400 poises, and its degree of polymerization at point D was 48 percent.

The plate product was found to have a reduced viscosity of 3.1 dl per gram at 25° C. in a 0.1% chloroform solution and contain 0.9 percent of the methyl methacrylate as the residual component. The preciseness in thickness of the plate in the widthwise direction were very good and they ranged from 2.87 mm. to 3.14 mm. The surfaces of the plate were smooth and excellent in overall surface quality.

EXAMPLE 4

An apparatus having a construction similar to that of FIG. 1 was employed, in which the straight portion between points A and B had a horizontal distance of 2,900 mm. and an inclination at an angle of 3° to the horizontal, while being supported by non-rotatable supporting bodies having a frame structure; the curved portion from point B to point D had a horizontal distance of 2,240 mm. and a radius of 25,423 mm. and it was supported at its both sides of the belts by sets of rollers; the straight portion between points C and D had a horizontal distance of 4,860 mm. and an inclination at an angle of 2.1° to the horizontal. The region of the path where the lower and upper runs of the respective belts follow was provided in the same manner as with the apparatus used in Example 3, with zones where the polymerization was carried out by the application of heat and the polymerized composition was further treated by the heat application, and a zone where the polymerized composition was cooled.

A syrup having a viscosity of 4 poises at 25° C. and containing a solution of 25 percent of polymethyl methacrylate and 0.02 percent of azobisdimethylvaleronitrile in methyl methacrylate was introduced continuously, together with the gaskets used in Example 1, into a spacing between the belts which were held under an initial tension of 5 kilograms per square mm. for the upper belt and under an initial tension of 4 kilograms per square mm. and operated at a belt speed of 270 mm. per minute. The viscosity of the syrup was 7,900 poises at point B and its degree of polymerization was 47 percent at point D.

The resulting plate product that was prepared so as to have a thickness of 3 mm. had its reduced viscosity of 3.5 dl per gram at 25° C. in a 0.1% chloroform solution and contained 1.2 percent of the methyl methacrylate residue therein. Its thickness in the widthwise direction ranged from 2.89 mm. to 3.11 mm., providing a very good preciseness in thickness and and at the same time an excellent overall surface quality.

What we claim is:

1. A process for continuously casting a liquid polymerizable composition which comprises feeding the liquid polymerizable composition, together with a pair of continuous gaskets, into a spacing defined between the lower run of the upper belt and the upper run of the lower belt both of which are arranged such that the pair of the endless belts are driven concurrently in the same direction at substantially the same speed, said gaskets being arranged so as to circumscribe the spacing serving as a pair of seals to confine a cavity whilst moving concurrently with the belts in contact with the opposing surfaces of the belts, passing the composition through a portion of the path of the belts where said composition is partially polymerized to such a viscosity that a common logarithm of its viscosity in terms of poise at the temperature of polymerization is within a range of 2 to 5, passing the resultant composition through a portion of the path thereof which is arranged so as to be curved at least once until the composition reaches a degree of polymerization within a range of about 40 to 60 weight percent based on the total weight of the composition, and thereafter passing through a straight portion of the path thereof for complete polymerization, while heat is applied to substantially the entire path thereof, said path for polymerization being arranged such that the lower and upper runs of the respective belts are brought closer together to follow shrinkage of the composition during the course of the polymerization, and removing the polymerized plate from the end portion of the belts at the discharge side thereof.

2. A process according to claim 1 wherein the composition is partially polymerized to provide a composition having such a viscosity that the common logarithm of its viscosity in terms of poise is in the range of 2.7 to 4.

3. A process according to claim 1 wherein the liquid polymerizable composition comprises at least one polymerizable, unsaturated monomer which is a methacrylate, styrene or a derivative thereof having at least one halogen atom and/or alkyl group substituent or a mixture thereof with a monomer containing at least one unsaturation copolymerizable with the monomers and which is an acrylate, acrylonitrile or a derivative thereof or a poly-functionally unsaturated monomer having at least two unsaturations and which is glycol dimethacrylate, diallyl methacrylate, diallyl phthalate, diethylene glycol or bisally carbonate.

4. A process according to claim 3 wherein the liquid polymerizable composition comprises methyl methacrylate.

5. A process according to claim 1 wherein a polymerization initiator is included in the polymerizable composition in the amount of from 0.005 to 5 percent by weight based upon the weight of the liquid polymerizable composition.

6. A process according to claim 5 wherein the polymerization initiator is at least one azo compound which is azobisisobutyronitrile, azobisdimethylvaleronitrile, or azobiscyclohexanenitrile, or at least one peroxide which is benzoyl peroxide, lauroyl peroxide, acetyl peroxide, caproyl peroxide, 2,4-dichlorobenzoyl peroxide, isopropyl peroxy dicarbonate, isobutyl peroxide, acetyl cyclohexylsulfonyl peroxide or bis(4-tert.-butylcyclohexyl)peroxydicarbonate or a mixture of an initiator of the former type with an initiator of the latter type.

7. A process according to claim 1 wherein the polymerization is carried out at a temperature in the range of from 50° to 150° C.

8. The method of claim 1, wherein the moving belts are conveyed through a curved path at least once at a radius of curvature determined by the following equation:

$$R = K \times S \times T$$

where R is the radius of curvature (in meters); S is an initial tension strength applied to the belt (in kilograms per square mm); T is the thickness of the belt (in mm); and K is a constant from about 2 to 100.

* * * * *